(12) United States Patent
Jang et al.

(10) Patent No.: US 8,855,648 B2
(45) Date of Patent: Oct. 7, 2014

(54) METHOD AND DEVICE FOR ADAPTABLY CONTROLLING BANDWIDTH OF CHANNEL

(75) Inventors: Kyung Hun Jang, Suwon-si (KR); Hyo Sun Hwang, Seoul (KR); Sunghyun Choi, Seoul (KR); Hyewon Lee, Yongin-si (KR); Kwanghun Han, Icheon-si (KR); Youngwoo Hwang, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 905 days.

(21) Appl. No.: 12/116,412

(22) Filed: May 7, 2008

(65) Prior Publication Data

US 2009/0191877 A1 Jul. 30, 2009

(30) Foreign Application Priority Data

Jan. 29, 2008 (KR) ........................ 10-2008-0009217

(51) Int. Cl.
| | | |
|---|---|---|
| *H04W 72/00* | (2009.01) | |
| *H04J 4/00* | (2006.01) | |
| *G06F 15/173* | (2006.01) | |
| *H04W 16/14* | (2009.01) | |
| *H04W 48/06* | (2009.01) | |
| *H04W 88/08* | (2009.01) | |

(52) U.S. Cl.
CPC ............. *H04W 16/14* (2013.01); *H04W 48/06* (2013.01); *H04W 88/08* (2013.01)
USPC ............ 455/438; 455/453; 370/436; 709/238

(58) Field of Classification Search
CPC ...... H04W 48/06; H04W 36/22; H04W 28/08
USPC .............. 370/230.1, 229, 329, 465, 480, 436; 455/438, 447, 452.1, 450–455; 709/238
See application file for complete search history.

(56) References Cited

U.S. PATENT DOCUMENTS

| | | | |
|---|---|---|---|
| 5,805,633 A | * | 9/1998 | Uddenfeldt ................... 375/133 |
| 6,374,112 B1 | | 4/2002 | Widegren et al. |

(Continued)

FOREIGN PATENT DOCUMENTS

| | | |
|---|---|---|
| CN | 1836459 A | 9/2006 |
| CN | 101064905 A | 10/2007 |

(Continued)

OTHER PUBLICATIONS

Chinese Office Action issued on Oct. 10, 2012 for the corresponding Chinese Application No. 200880125838.6; 9 Pages with Full English Translation.

*Primary Examiner* — Nizar Sivji
(74) *Attorney, Agent, or Firm* — NSIP Law

(57) ABSTRACT

Disclosed are a base station and mobile station to adaptively control a bandwidth of a channel. The base station includes a state information recognition unit to recognize neighboring-state information related with a traffic load of at least one neighboring network adjacent to a target network, a control state information transmitting unit to transmit control state information related with the controlled bandwidth of the target channel to mobile stations of the target network, and a bandwidth control unit to control a bandwidth of a target channel used in the target network according to a bandwidth of a channel used in the neighboring network based on the neighboring-state information.

19 Claims, 6 Drawing Sheets

(56) References Cited

U.S. PATENT DOCUMENTS

| | | |
|---|---|---|
| 6,418,317 B1 | 7/2002 | Cuffaro et al. |
| 6,650,655 B2 * | 11/2003 | Alvesalo et al. ............. 370/468 |
| 6,785,252 B1 | 8/2004 | Zimmerman et al. |
| 6,986,156 B1 | 1/2006 | Rodriguez et al. |
| 7,006,530 B2 | 2/2006 | Spinar et al. |
| 7,729,262 B2 * | 6/2010 | Crandall et al. ............. 370/238 |
| 7,826,850 B2 * | 11/2010 | Matoba et al. ................ 455/450 |
| 2005/0007979 A1 | 1/2005 | Tsien et al. |
| 2006/0063533 A1 | 3/2006 | Matoba et al. |
| 2007/0032254 A1 * | 2/2007 | Chen ............................ 455/509 |
| 2007/0232311 A1 * | 10/2007 | Kuhn et al. ................... 455/436 |
| 2008/0095050 A1 * | 4/2008 | Gorokhov et al. ............ 370/229 |
| 2008/0130591 A1 * | 6/2008 | Kwon ........................... 370/336 |
| 2009/0034457 A1 * | 2/2009 | Bahl et al. ..................... 370/329 |
| 2010/0248739 A1 * | 9/2010 | Westerberg et al. .......... 455/453 |

FOREIGN PATENT DOCUMENTS

| | | |
|---|---|---|
| JP | 10-13921 | 1/1998 |
| JP | 2007-300419 | 11/2007 |
| KR | 2004-28072 | 4/2004 |
| KR | 2007-29357 | 3/2007 |
| KR | 2007-49091 | 5/2007 |
| WO | WO 99/14967 | 3/1999 |
| WO | WO 00/50971 | 8/2000 |
| WO | WO 2007/047670 A1 | 4/2007 |
| WO | WO 2007/047785 A1 | 4/2007 |
| WO | WO 2008/004561 A1 | 1/2008 |

* cited by examiner

METHOD AND DEVICE FOR ADAPTABLY CONTROLLING BANDWIDTH OF CHANNEL

CROSS-REFERENCE TO RELATED APPLICATION

This application claims the benefit of Korean Patent Application No. 10-2008-0009217, filed on Jan. 29, 2008, in the Korean Intellectual Property Office, the entire disclosure of which is incorporated herein by reference.

BACKGROUND OF THE INVENTION

1. Field of the Invention

Aspects of the present invention relates to a method and device to adaptably control a bandwidth of a channel, and more particularly, to a method and device to adaptably control a bandwidth of a channel which adaptably controls a channel bandwidth, and transmits information related with the controlled channel bandwidth to mobile stations.

2. Description of the Related Art

In general, a communication system including a cognitive radio communication system may divide an available frequency band into a fixed size, and use the divided frequency band.

For example, it is assumed that A and B networks are present and the available bandwidth is 60 MHz. In this instance, a bandwidth of a channel used in each of A and B networks may be generally fixed as 20 MHz, respectively, and mobile stations and base stations included in A and B networks may perform a communication using the fixed bandwidth of the channel, respectively.

However, a traffic load of each of A and B networks may be changed due to mobility of the mobile stations and change in provided services. Specifically, a capacity required in each of A and B networks may be changed in real time. Accordingly, when A and B networks communicate using the fixed bandwidth of the channel, respectively, optimum capacity utilization may not be realized.

For example, when a traffic load of B network is about two times higher than that of A network, using the fixed bandwidth of the channel by A and B networks may be inefficient.

Therefore, there arises a need for a technique to maximize frequency efficiency in consideration of a traffic load of a network, a communication environment, an available frequency band, and the like.

SUMMARY OF THE INVENTION

An aspect of the present invention provides a base station which adaptably controls a bandwidth in consideration of communication environments of a neighboring network and a target network, and shares information related with the controlled bandwidth with mobile stations, thereby improving frequency efficiency and a transmission rate.

According to an aspect of the present invention, a base station includes a state information recognition unit to recognize neighboring-state information related with a traffic load of at least one neighboring network adjacent to a target network, a control state information transmitting unit to transmit control state information related with the controlled bandwidth of the target channel to mobile stations of the target network, and a bandwidth control unit to control a bandwidth of a target channel used in the target network according to a bandwidth of a channel used in the neighboring network based on the neighboring-state information.

According to an aspect of the present invention, a mobile station includes a control state information reception unit to receive, from a base station of a target network, control state information related with a controlled bandwidth of a target channel, the base station controlling the bandwidth of the target channel based on a traffic load of at least one neighboring network adjacent to the target network and a bandwidth of a channel of the neighboring network, and a frequency band setting unit to set a communication frequency band corresponding to the bandwidth of the target channel based on the control state information.

According to an aspect of the present invention, a device to control a bandwidth of a channel includes a traffic load recognition unit to recognize a traffic load of a first network and a traffic load of a second network adjacent to the first network, a bandwidth determination unit to determine a bandwidth of a first channel used in the first network and a bandwidth of a second channel used in the second network based on a ratio of the traffic load of the first network to the traffic load of the second network, and an information transmitting unit to transmit information related with the determined bandwidths of the first and second channels to the first network and the second network, respectively.

According to an aspect of the present invention, a method to operate a base station includes recognizing neighboring-state information related with a traffic load of at least one neighboring network adjacent to a target network, controlling a bandwidth of a target channel used in the target network according to a bandwidth of a channel used in the neighboring network based on the neighboring-state information, and transmitting control state information related with the controlled bandwidth of the target channel to mobile stations of the target network.

According to an aspect of the present invention, a method to operate a mobile station includes receiving, from a base station of a target network, control state information related with a bandwidth of a controlled target channel, the base station controlling the bandwidth of the target channel according to a traffic load of at least one neighboring network adjacent to the target network and a bandwidth of a channel used in the neighboring network, setting a communication frequency band corresponding to the bandwidth of the target channel based on the control state information, and feeding-back information related with the set communication frequency band to the base station. Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following detailed description of the embodiments, taken in conjunction with the accompanying drawings of which.

DETAILED DESCRIPTION OF EXEMPLARY EMBODIMENTS

Figure 1:
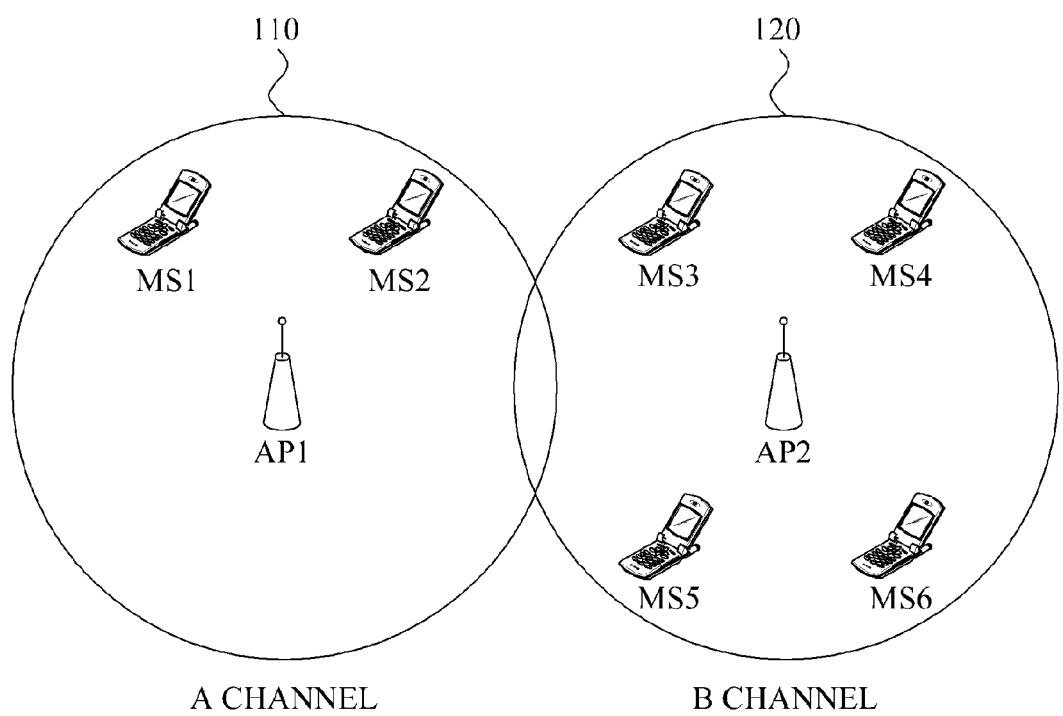
FIG. 1 illustrates a first network and a second network used to describe an embodiment of the present invention.

Reference will now be made in detail to the present embodiments of the present invention, examples of which are illustrated in the accompanying drawings, wherein like reference numerals refer to the like elements throughout. The embodiments are described below to explain the present invention by referring to the figures.

FIG. 1 illustrates a first network and a second network used to describe an embodiment of the present invention.

Referring to FIG. 1, the first network includes a first Mobile Station (MS 1), a second Mobile Station (MS 2), and a first Access Point (AP 1), and the second network includes a third Mobile Station (MS 3), a fourth Mobile Station (MS 4), a fifth Mobile Station (MS 5), a sixth Mobile Station (MS 6), and a second Access Point (AP 2).

Also, cell coverage 110 of AP 1 and cell coverage 120 of AP2 is shown in FIG. 1, and the first and second networks may use A and B channels, respectively.

In this instance, when each of the mobile stations MS 1, MS 2, MS 3, MS 4, MS 5, and MS 6 requires services having an identical capacity, a traffic load generated from each of the mobile stations may be identical. As illustrated in FIG. 1, it can be seen that two mobile stations MS 1 and MS 2 are included in the first network, and four mobile stations MS 3, MS 4, MS 5, and MS 6 are included in the second network. When bandwidths of A and B channels used by the first and second networks are identical to each other, the required data transmission rate may be difficult to be obtained, and the frequency efficiency may be reduced.

For example, in the case where a wholly available frequency bandwidth is 60 MHz, and each of bandwidths of A and B channels is 20 MHz, the traffic load of the second network is greater than that of the first network. As a result, qualities of services with which the mobile stations MS 3, MS 4, MS 5, and MS 6 included in the second network are provided may be deteriorated in comparison with those of services with which the mobile stations MS 1 and MS 2 included in the first network are provided. In addition, a total bandwidth used in the first and second networks is 40 MHz, and thus deteriorating the frequency use efficiency due to the unused 20 MHz.

Thus, when the bandwidth is adaptively adjusted according to the traffic load generated from respective networks, the frequency use efficiency may increase, and services having a desired quality may be provided.

Figure 2:
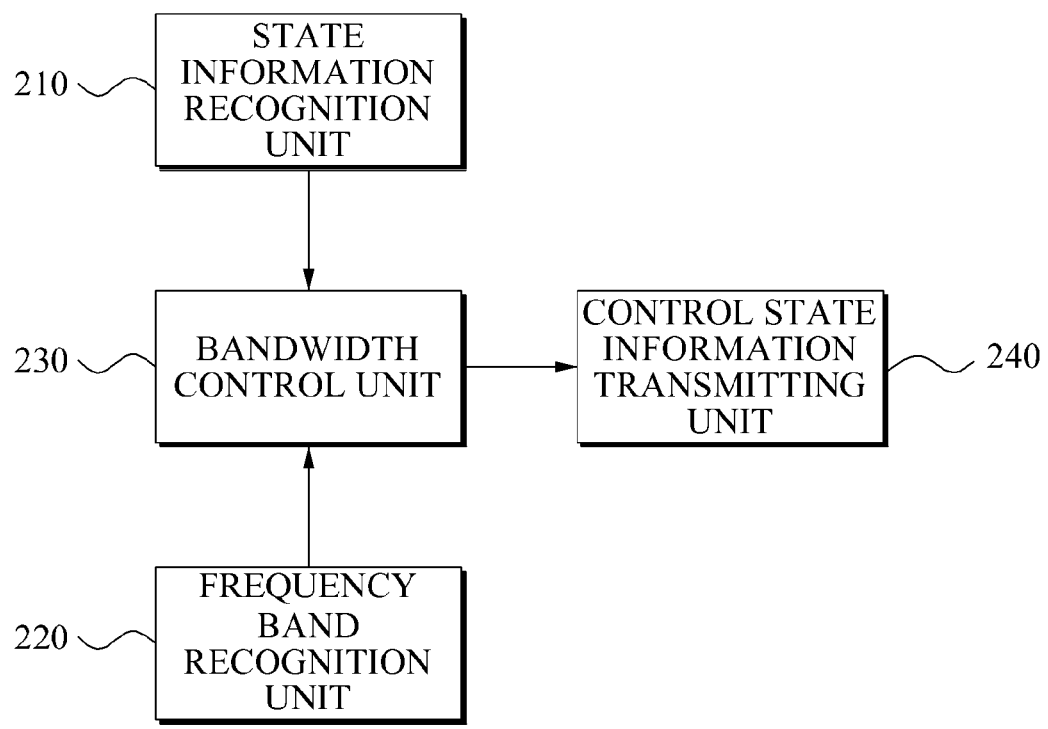
FIG. 2 is a block diagram illustrating a base station according to an embodiment of the present invention.

FIG. 2 is a block diagram illustrating a base station according to an embodiment of the present invention.

Referring to FIG. 2, the base station according to the present embodiment includes a state information recognition unit 210, a frequency band recognition unit 220, a bandwidth control unit 230, and a control state information transmitting unit 240.

Hereinafter, it will be described on the assumption that the base station according to the present embodiment is installed in a target network. However, a device to control a bandwidth of a channel according to the present embodiment may be installed separately from the base station, and thus adjusting the channel bandwidth used in the first and second networks, respectively.

The state information recognition unit 210 may recognize neighboring-state information related with a traffic load of at least one neighboring network adjacent to the target network. In this instance, the neighboring-state information may further include information related with a number of mobile stations of the neighboring network as well as the traffic load of the neighboring network.

Accordingly, the base station may recognize a communication environment of the neighboring network such as the traffic load of the neighboring network, the number of mobile stations of the neighboring network, and the like. In particular, the base station may compare the traffic load of the target network and the traffic load of the neighboring network based on the neighboring-state information, thereby recognizing which network requires a greater radio resource.

Also, the frequency band recognition unit 220 may recognize a frequency band capable of being used by the target network. In particular, the frequency band recognition unit 220 may be unused in another network using a cognitive radio technique, or recognize an available frequency band to minimize the effect of the target network on another network.

Also, the bandwidth control unit 230 may control a bandwidth of the target channel used in the target network according to a bandwidth of the channel used in the neighboring network based on the neighboring-state information. In particular, the bandwidth control unit 230 may control the bandwidth of the target channel based on a ratio of the traffic load of the target network to the traffic load of the neighboring network.

For example, when the traffic load of the neighboring network is greater than that of the target network, the bandwidth control unit 230 may control such that the bandwidth of the target channel is less than that of the channel used in the neighboring network. In this instance, the bandwidth of the channel used in the neighboring network is increasing while the bandwidth of the target channel is decreasing, and therefore the neighboring network can appropriately cope with the traffic load.

Also, the control state information transmitting unit 240 may transmit information related with the controlled bandwidth of the target channel to the mobile stations of the target network. In this instance, the control state information may include information related with a center frequency, noise level, and busy ratio of the target channel.

In particular, the control state information transmitting unit 240 may transmit the control state information to the mobile stations included in the target network using a beacon frame.

When the bandwidth of the target channel is adaptively controlled, the center frequency, noise level, and busy ratio of the target channel may be changed. In this instance, the control state information transmitting unit 240 may transmit the center frequency, noise level, and busy ratio of the target channel, which are changed by controlling the bandwidth of the target channel, to the mobile stations using the beacon frame.

Figure 3:
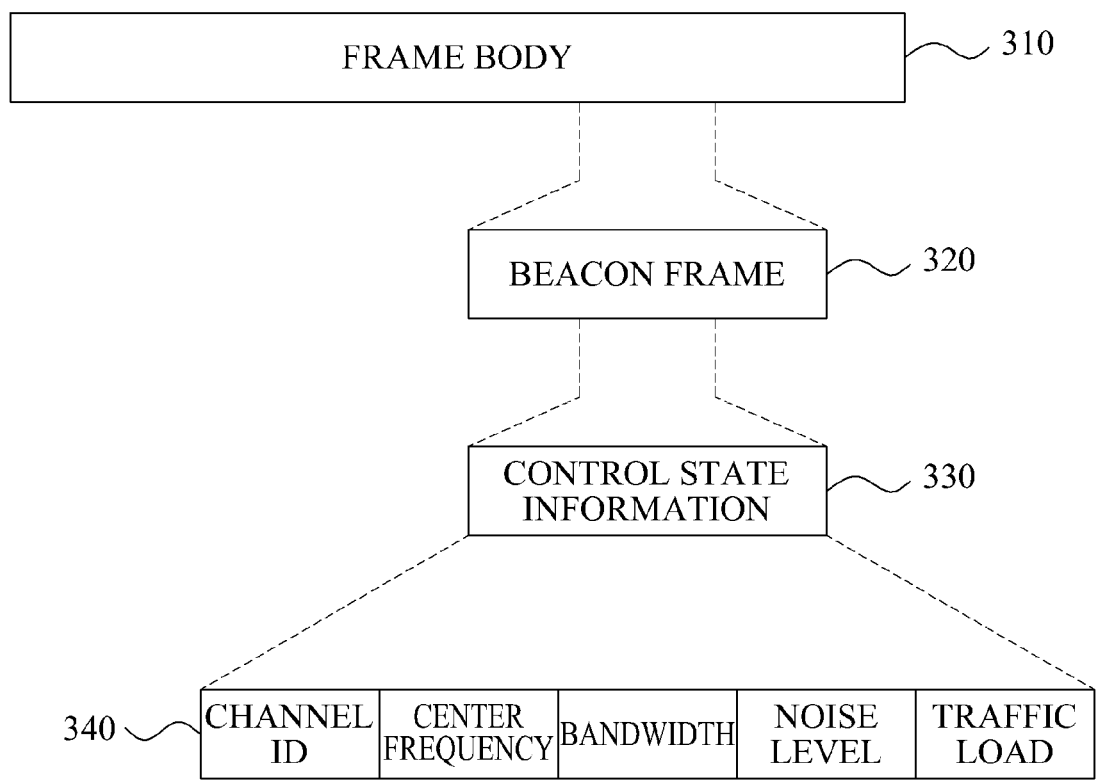
FIG. 3 illustrates control state information included in a beacon frame according to an embodiment of the present invention.

FIG. 3 illustrates control state information included in a beacon frame according to an embodiment of the present invention.

Referring to FIG. 3, a frame body 310 is included in a data frame of data transmitted from the base station. A beacon frame 320 may be included in the frame body 310, and a control state information 330 may be included in a beacon frame 320 and thereby the included control state information may be transmitted to the mobile stations.

The control state information 330 may include information 340 related with an Identification (ID), center frequency, bandwidth, noise level, and traffic load of the target channel as shown in FIG. 3, when the frequency band of the target channel is controlled. In this instance, mobile stations of the target network may acquire the information related with the ID, center frequency, bandwidth, noise level, and traffic load of the target channel based on the control state information 330 included in the beacon frame 320.

In this instance, the mobile stations of the target network may set a communication frequency band corresponding to the controlled bandwidth of the target channel based on a frequency band capable of being used by the mobile stations and characteristics of a Radio Frequency (RF) module based on the control state information 330.

In addition, the mobile stations of the target network may report information related with the set communication frequency band to the base station, and the base station may recognize a communication frequency band of the mobile stations of the target network based on the information reported by the mobile station. Then, the base station may perform a downlink communication based on the communication frequency bandwidth of the mobile stations of the target network at a later time.

Figure 4:
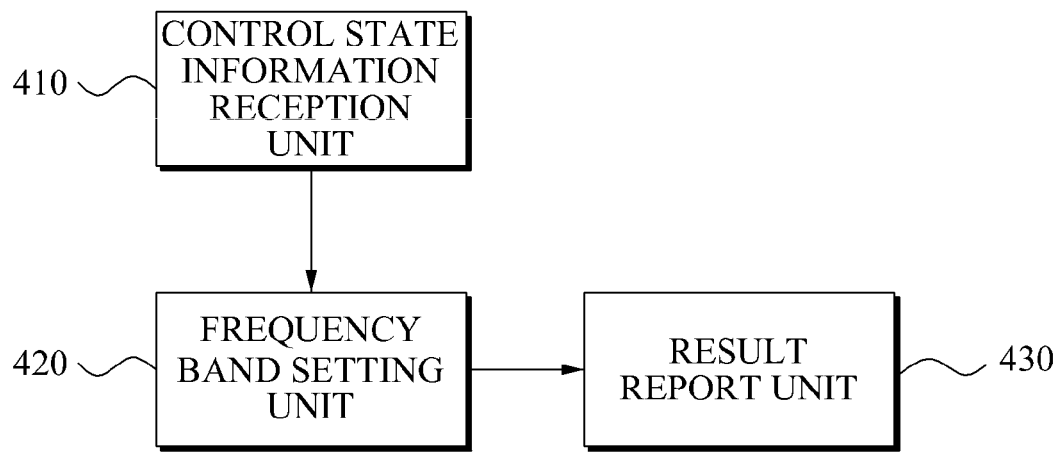
FIG. 4 is a block diagram illustrating a mobile station according to an embodiment of the present invention.

FIG. 4 is a block diagram illustrating a mobile station according to an embodiment of the present invention.

Referring to FIG. 4, the mobile station according to the present embodiment includes a control state information reception unit 410, a frequency band setting unit 420, and a result report unit 430.

A base station may control a bandwidth of a target channel based on a traffic load of at least one neighboring network adjacent to a target network and a bandwidth of a channel used in the target network. Also, the base station may transmit, to the mobile stations, control state information, that is, information related with the controlled bandwidth of the target channel.

In this instance, the control state information reception unit 410 may receive, from the base station of the target network, the control state information related with the controlled bandwidth of the target channel. Here, the control state information may include information related with a center frequency, bandwidth, noise level, and busy ratio of the target channel, as described above.

Also, the frequency band setting unit 420 may set a communication frequency band corresponding to the bandwidth of the target channel based on the received control state information. Specifically, since the control state information may include information related with the controlled bandwidth of the target channel, the frequency band setting unit 420 may set a communication frequency band corresponding to the controlled bandwidth of the target channel based on characteristics of an RF module installed in the mobile station, and a frequency band capable of being used by the mobile station.

Also, the result report unit 430 may feed back an operation result of the frequency band setting unit 420 to the base station. For example, when the frequency band setting unit 420 changes the communication frequency band from an A band to a B band, the result report unit 430 may feed back information related with the change in the communication frequency band to the base station. In this instance, the base station may perform a downlink communication based on the fed back information at a later time.

Figure 5:
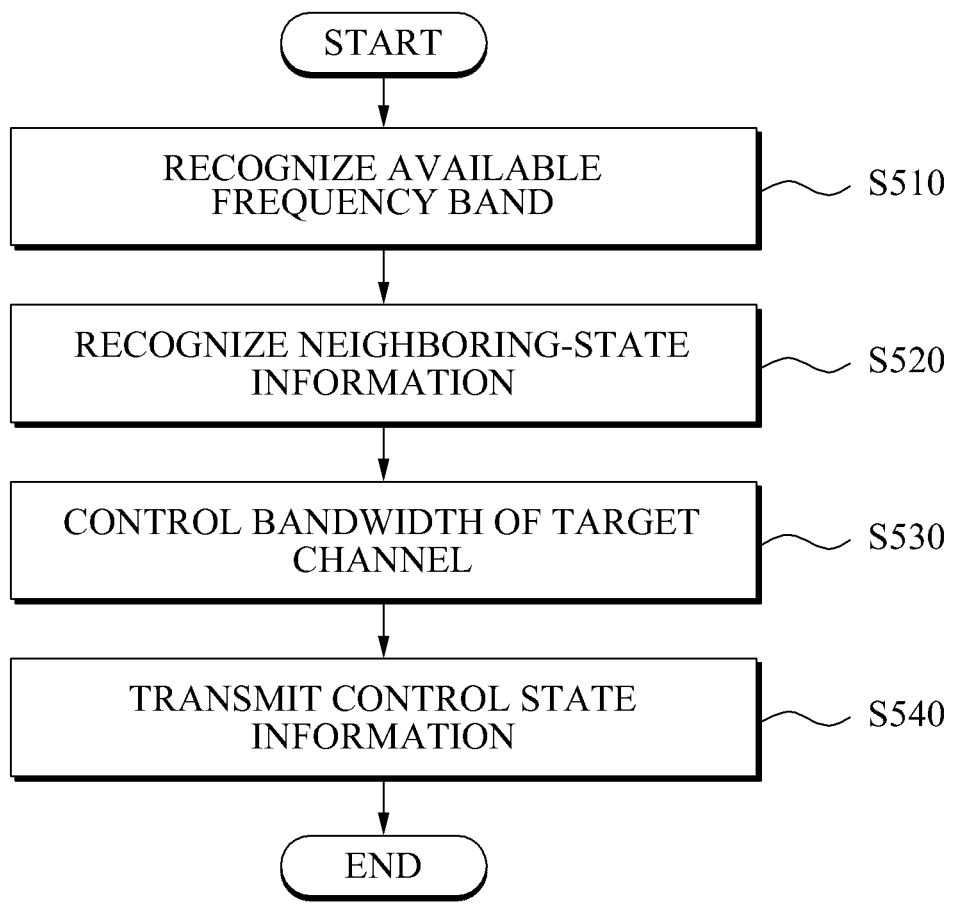
FIG. 5 is an operation flowchart illustrating an operation method of a base station according to an embodiment of the present invention.

FIG. 5 is an operation flowchart illustrating an operation method of a base station according to an embodiment of the present invention.

Referring to FIG. 5, in the operation method of the base station according to the present embodiment, the base station may recognize an available frequency band using the cognitive radio technique in operation S510.

Next, in operation 520, the base station may recognize neighboring-state information related with a traffic load of at least one neighboring network adjacent to a target network.

In operation S530, the base station may control a bandwidth of a target channel used in the target network within a range of the recognized available frequency band according to a bandwidth of a channel used in the neighboring network based on the neighboring-state information.

In this instance, operation S530 to control the bandwidth of the target channel may be an operation to control the bandwidth of the target channel based on a ratio of a traffic load of the target network to a traffic load of the neighboring network.

In operation S540, the base station may transmit control state information related with the controlled bandwidth of the target channel to the mobile stations included in the target network.

In this instance, the control state information may further include information related with at least one of a center frequency, noise level, and busy ratio of the target channel.

Figure 6:
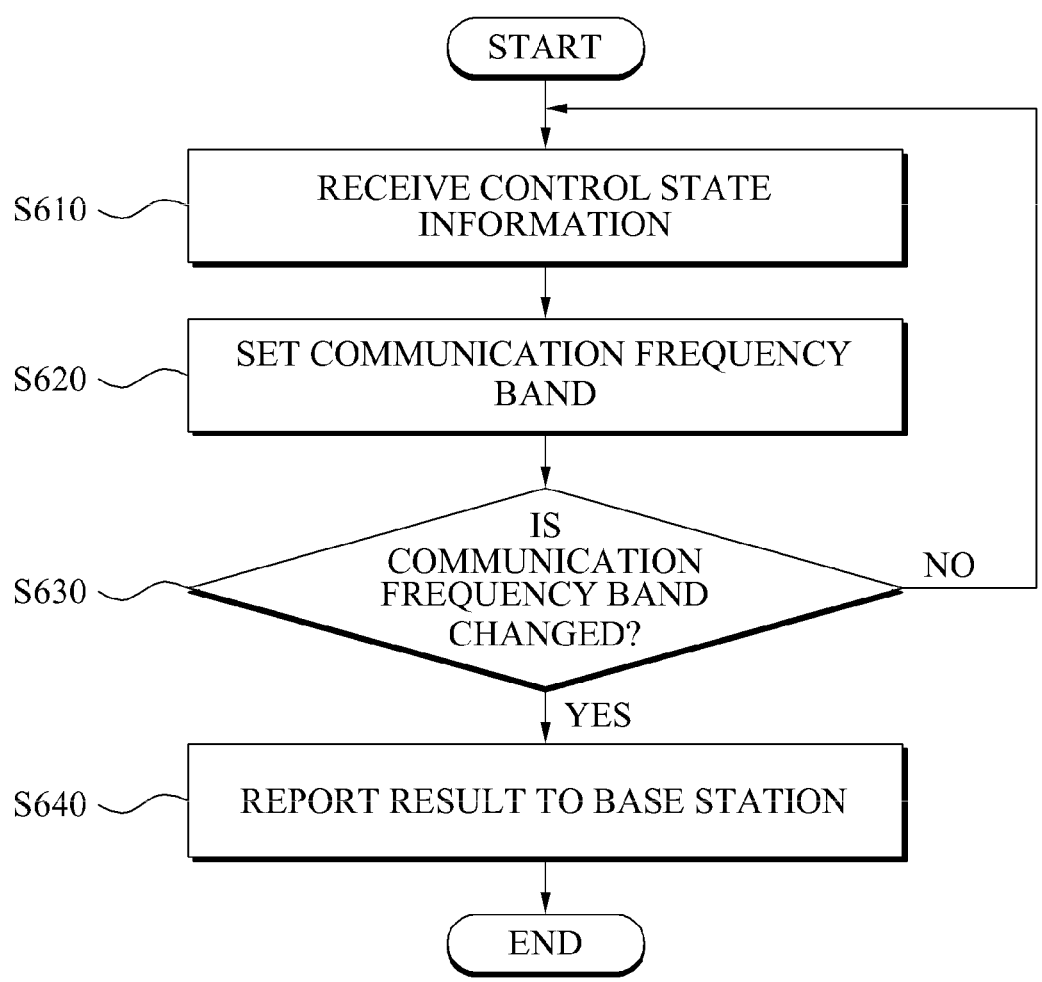
FIG. 6 is an operation flowchart illustrating an operation method of a mobile station according to an embodiment of the present invention.

FIG. 6 is an operation flowchart illustrating an operation method of a mobile station according to an embodiment of the present invention.

Referring to FIG. 6, in the operation method of the mobile station according to the present embodiment, the mobile station may receive, from a base station of a target network, control state information related with a controlled bandwidth of a target channel in operation S620. In this instance, the base station may control the bandwidth of the target channel based on a traffic load of at least one neighboring network adjacent to the target network and a bandwidth of a channel used in the neighboring network, and transmit the control state information to the mobile station.

In this instance, operation S610 may be an operation to receive the control state information using a beacon frame.

In operation S620, the mobile station may set a communication frequency band corresponding to the bandwidth of the target channel.

In operation S630, the mobile station may determine whether the communication frequency band is changed.

When the communication frequency band is changed, the mobile station may report information on the change in the communication frequency band to the base station in operation S640. Conversely, when the communication frequency band is not changed, the mobile station may again perform operation S610.

Descriptions of FIGS. 5 and 6 corresponding to descriptions given with respect to FIGS. 1 to 4 are herein omitted.

The above-described embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of accomplishing aspects of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it would be appreciated by those skilled in the art that changes may be made to these exemplary embodiments without departing from the principles and spirit of the invention, the scope of which is defined by the claims and their equivalents.

What is claimed is:

1. A base station comprising:
a state information recognition unit configured to recognize neighboring-state information related to a traffic load and related to a number of mobile stations of at least one neighboring network adjacent to a target network;
a bandwidth control unit configured to control a bandwidth of a target channel used in the target network according to a bandwidth of a channel used in the neighboring network based on the neighboring-state information; and
a frequency band recognition unit configured to recognize an available frequency band by the target network using a cognitive radio technique, wherein:
the bandwidth control unit controls the bandwidth of the target channel within a range of the available frequency band, and
the bandwidth control unit further controls the bandwidth of the target channel based on a ratio of a traffic load of the target network to a traffic load of the neighboring network and based on the number of mobile stations of the at least one neighboring network.

2. The base station of claim 1, further comprising:
a control state information transmitting unit configured to transmit control state information related to the controlled bandwidth of the target channel to mobile stations of the target network.

3. The base station of claim 2, wherein the control state information further includes information related to a center frequency, or a noise level, or a busy ratio of the target channel, or a combination thereof.

4. The base station of claim 2, wherein the control state information transmitting unit transmits the control state information using a beacon frame.

5. The base station of claim 1, wherein a cell coverage of the neighboring network is different from a cell coverage of the target network.

6. A mobile station comprising:
a control state information reception unit configured to receive, from a base station of a target network, control state information related to a controlled bandwidth of a target channel, the base station controlling the bandwidth of the target channel within a range of an available frequency band recognized by the base station through the target network using a cognitive radio technique and based on a traffic load, a number of mobile stations of at least one neighboring network adjacent to the target network, a bandwidth of a channel of the neighboring network, and the ratio of a traffic load of the target network to a traffic load of the neighboring network; and
a frequency band setting unit configured to set a communication frequency band corresponding to the bandwidth of the target channel based on the control state information.

7. The mobile station of claim 6, wherein the control state information further includes information related to a center frequency, or a noise level, or a busy ratio of the target channel, or any combination thereof.

8. The mobile station of claim 6, wherein the control state information reception unit receives the control state information using a beacon frame.

9. The mobile station of claim 6, further comprising:
a result report unit configured to feed back an operation result of the frequency band setting unit to the base station.

10. The mobile station of claim 6, wherein a cell coverage of the neighboring network is different from a cell coverage of the target network.

11. A device to control a bandwidth of a channel, the device comprising:
a traffic load recognition unit configured to recognize a traffic load of a first network and a traffic load of a second network adjacent to the first network;
a bandwidth determination unit configured to determine a bandwidth of a first channel used in the first network and a bandwidth of a second channel used in the second network based on a ratio of the traffic load of the first network to the traffic load of the second network; and
an information transmitting unit configured to transmit information related to the determined bandwidths of the first and second channels to the first network and the second network, respectively; and
a frequency band recognition unit configured to recognize an available frequency band by the first network using a cognitive radio technique, wherein:
the bandwidth determination unit determines the bandwidth of the first channel within a range of the available frequency band, and
the bandwidth determination unit further determines the bandwidths of the first and second channels further based on a number of mobile stations of the first network, and a number of mobile stations of the second network.

12. The device of claim 11, wherein a cell coverage of the first network is different from a cell coverage of the second network.

13. A method of operating a base station, the method comprising:
recognizing neighboring-state information related to a traffic load and a number of mobile stations of at least one neighboring network adjacent to a target network;
controlling a bandwidth of a target channel used in the target network according to a bandwidth of a channel used in the neighboring network based on the neighboring-state information and based on the number of mobile stations of the at least one neighboring network;
transmitting control state information related to the controlled bandwidth of the target channel to mobile stations of the target network; and
recognizing an available frequency band by the target network using a cognitive radio technique, wherein
the controlling comprises controlling the bandwidth of the target channel within a range of the available frequency band, and according to a ratio of a traffic load of the target network to a traffic load of the neighboring network.

14. The method of claim 13, wherein the control state information further includes information related to a center frequency, or a noise level, or a busy ratio of the target channel, or any combination thereof.

15. The method of claim 13, wherein a cell coverage of the neighboring network is different from a cell coverage of the target network.

16. A method of operating a mobile station, the method comprising:
- receiving, from a base station of a target network, control state information related to a bandwidth of a controlled target channel, the base station controlling the bandwidth of the target channel within a range of an available frequency band recognized by the base station through the target network using a cognitive radio technique and according to a traffic load, a number of mobile stations of at least one neighboring network adjacent to the target network, a bandwidth of a channel used in the neighboring network, and the ratio of a traffic load of the target network to a traffic load of the neighboring network;
- setting a communication frequency band corresponding to the bandwidth of the target channel based on the control state information; and
- feeding back information related to the set communication frequency band to the base station.

17. The method of claim 16, wherein the receiving comprises receiving the control state information using a beacon frame.

18. The method of claim 16, wherein a cell coverage of the neighboring network is different from a cell coverage of the target network.

19. A non-transitory computer-readable recording medium storing a program for implementing the method of claim 13 by a computer.

* * * * *